United States Patent Office 2,978,329
Patented Apr. 4, 1961

2,978,329

PROCESS OF PREPARING YEAST-LEAVENED BAKED GOODS

Walter M. Cochran, Highland Park, and Fred Eber, Northbrook, Ill., assignors to The Glidden Company, Cleveland, Ohio, a corporation of Ohio No Drawing. Filed July 29, 1957, Ser. No. 674,605

4 Claims. (Cl. 99—90)

This invention relates to improvements in bakery products resulting from the use therein of powdered emulsifiers in amounts providing essentially the total required amount of emulsifier. It also relates to an improved method for preparing bakery products, and to a flour product which consists of powdered emulsifier(s) mixed with said flour.

Edible emulsifiers are nowadays commonly employed in preparing baked goods such as yeast-leavened products (e.g. bread, buns, rolls, coffee cake, etc.) or chemically-leavened products (e.g. cakes, doughnuts, etc.) In the past the emulsifiers frequently were introduced into the dough or batter by first blending them uniformly with the shortening. Another way to introduce them was to mix them into the dough or batter in the form of plasticized mass resembling plastic shortening. Still another way was to introduce them in the form of an aqueous emulsion. We have now found that significant improvements in baked goods can be accomplished by introducing the emulsifier(s) in the form of free-flowing powders.

Accordingly, one object of this invention is to provide improved yeast-leavened bakery products prepared by introducing the emulsifier(s) in the form of finely-divided free-flowing powders.

A further object is to provide an improved method for preparing yeast-leavened goods, which method is charcaterized by introducing the emulsifier(s), in the form of finely divided, free-flowing powders, into the dry ingredients of a selected recipe in advance of adding any liquid ingredients.

Another object is to provide finely-divided, free-flowing, edible emulsifier powders.

Still another object is to provide an improved flour product which consists of flour mixed with powdered emulsifiers(s), the latter being present in amounts sufficient to provide substantially all the emulsifier(s) needed in preparing a selected baked product from said flour product.

These and other objects will be understood from the following detailed description of our invention.

In accordance with the present invention, no major change is made in the proportion or kinds of ingredients in the usual recipes for yeast-leavened goods other than to initially provide the emulsifier(s) which are suited to the recipes as a separate and physically-distinct entity having the physical form of finely-divided free-flowing powders. Thus, where a recipe calls for emulsified shortening, one would use unemulsified shortening and would secure and use a physically-separate supply of appropriate powdered emulsifier. Where the recipe normally calls for plasticized emulsifier(s) or an emulsion of emulsifiers, the powdered emulsifiers would be used instead. Of course, the water requirements of the recipe would be adjusted to compensate for whatever water would have been added with the emulsifier where an aqueous emulsion is replaced with powdered emulsifier(s). Downward adjustment would also be made in the amount of emulsifier(s) to take advantage of the increase in efficiency of the powdered emulsifier(s). In veiw of the foregoing, those skilled in the art will recognize that little is to be gained by way of description in reviewing here the formulation of the many diverse recipes which are known for baked goods of the above-identified type.

The invention obviously does not contemplate the use of edible emulsifiers which by reason of their normal physical state cannot be reduced by appropriate methods to a finely-divided free-flowing powdery condition. Thus, liquid emulsifiers and/or soft, plastic emulsifiers are not contemplated. The emulsifiers which are normally in a hard, sometimes brittle, state and which can therefore be powdered successfully and retained in a powdery condition are most commonly the partial esters of polyhydric alcohols, the acyloxy groupings thereon being (a) one or more residues of palmitic acid, stearic acid, and longer-chain fatty acids having up to about 24 carbons; i.e. residues derived from fatty acids which have a melting point at least as high as that of palmitic acid, with or without (b) residues of edible monocarboxylic non-fatty acids, having 2 to 6 carbons, including edible lower hydroxy carboxylic acids such as lactic acid, hydroxyacetic acid, hydroxy butyric acid, tartaric acid, citric acid, etc. The edible polyhydric alcohols used in preparing such emulsifiers can contain up to 12 carbon atoms and include propylene glycol, polyoxyethylene glycols, glycerine, sorbitol, mannitol, sucrose, sorbitol anhydride, and other edible compounds having at least 2 esterifiable hydroxyl groups. Thus mono- and di-glycerides of palmitic and/or stearic acid are useful emulsifiers, as are the solid partial mix esters described in U.S. Patents 2,690,971 (Iveson et al.); 2,509,414 (Barsky); 2,480,332 (Little); and copending application S.N. 735,070, filed May 13, 1958.

The invention is not limited to the latter emulsifiers, however, since any normally-solid fracturable edible emulsifier or emulsifier-hard fat blend which is beneficial in yeast-leavened baked goods can be employed, e.g. lecithin or the alcohol-soluble and/or alcohol-insoluble moieties of lecithin or hydroxylated lecithin (U.S. 2,629,662) dissolved or dispersed in a normally-solid edible fat carrier (see copending application Ser. No. 232,868, filed June 21, 1951). Mixtures of various powdered emulsifiers can, of course, be used.

The normally-solid emulsifiers, emulsifier mixtures or emulsifier-hard fat blends which are solid at ambient room temperatures can be reduced to a powdery state by various known methods such as by spraying the melted emulsifier, or a solution of the emulsifier in a volatile organic solvent, through nozzles and cooling or otherwise solidifying the so formed particles, or by grinding the solid emulsifiers in suitable wet or dry grinding or pulverizing devices. The fineness of the resulting powders is not critical as long as the coarsest particles are not larger than about 150 microns, and preferably not coarser than about 105 microns. It is desirable, of course, to secure the finest possible particles and particle size distribution since the finer the particles are, the more uniform will be their effects on the dough or batter.

When incorporating our powdered emulsifier(s) into a recipe it is beneficial to add them along with the dry ingredients, e.g. along with the flour(s), sugar (if any), baking powder (if any), milk powder, dried eggs, etc. We have found that the emulsifiers have a beneficial effect on the changes which flours undergo when the liquids of a recipe are brought into contact with the flours. Hence the most desirable objective is to distribute the powdered emulsifiers as uniformly as possible through the dry ingredients before any liquids are added. When this is accomplished, the particles of emulsifier are then already in close proximity to particles of flour and hence are in an effective position to exert their benefits on the flour as soon as water reaches the batter. Best results are obtained by originally dispersing the powdered emulsifiers through the flour itself as uniformly as possible by having the emulsifiers as finely divided as the flour itself.

The benefits which we have observed to flow from use of powdered emulsifiers rather than the forms heretofore employed are:

(1) In bread, buns, rolls, etc. (yeast-leavened products) the effectiveness of the emulsifiers is markedly increased, thereby making it possible to use less emulsifier. This is a significant advantage, particularly in connection with bread, since the amount of emulsifer(s) permitted in bread by governmental regulations is limited. Hence a given weight of powdered emulsifier permitted by the regulations will give a superior bread as compared with the same weight of the same emulsifier when introduced in the manners heretofore employed. Moreover, the powdered emulsifiers yield bread, roll and bun sponges which are drier and less sticky, hence requiring less dusting with flour to overcome stickiness. Better gas retention in the fermentation stage has also been found along with faster fermentation due in part to faster commencement of fermentation. The sponge has been found to be shorter, i.e., less tenacious when pulled apart, and the final dough resulting from the sponge has been found to be more extensible. We have also found that the final dough yields a baked loaf, roll or bun having a richer brown color in the crust. Various other technical benefits are illustrated in the subjoined examples.

In sweet dough prepared mixes, the use of powdered emulsifiers is beneficial in giving a mix which is less greasy and which will therefore pack more easily and exhibit less tendency to ball up in lumps or to become packed in the package. Reductions in plastic shortening content up to 20% have been found to be possible without loss of any of the desirable criteria which are expected in the resulting baked products. In accordance with the present invention the emulsifiers in the emulsified shortening heretofore used in such mixes would be powdered and added to the mixes apart from the shortening.

The following examples illustrate the principles of our invention and include the best modes presently known to us for practicing those principles.

EXAMPLE 1

Six batches of bread were made up according to the following recipe to use the five different kinds and/or forms of emulsifiers shown in the table below.

*White bread formula*

| Percent | Sponge Stage, gm. | Ingredients | Dough Stage, gm. | Percent | Percent Total [1] |
|---|---|---|---|---|---|
| 65 | 910 | Flour (Patent) | 490 | 35 | 100 |
| 56 | 510 | Water | 400 | 65 | 65 |
| 2.25 | 31.5 | Yeast | | | 2.25 |
| 0.5 | 7.0 | Yeast Food | | | 0.5 |
| 3 | 42 | Shortening+Emulsifier [2] | | | 3.0 |
| | | Milk Solids | 42 | 3 | 3.0 |
| | | Salt | 28 | 2 | 2.0 |
| | | Sugar—50% Dextrose | 92 | 8 | 8.0 |

[1] Based on flour.
[2] Emulsifier level maintained at 8% monoglyceride (wt.) based on non-emulsified fat of the shortening.

Prepare sponge as follows:

(1) Place in mixer the flour, yeast food, shortening and emulsifier.
(2) Then add yeast in the form of a solution thereof in part of the water.
(3) Add balance of water.
  Mix sponge 1 min. at low speed on dough mixing machine; 4 min. at high speed on dough mixing machine (65 r.p.m.).
(4) Allow 4 hrs. fermentation during which time the temperature of the dough should rise from 76° F. to 88° F.
(5) Add remaining ingredients of the recipe to give a dough.
(6) Mix dough 1 min. at low speed; 7 min. at high speed (65 r.p.m.) (temp. of dough 82° F.).
(7) Floor time: 30 min.
(8) Intermediate: 15 min.
(9) Proof time after molding: 55–60 minutes.
(10) Bake 25 minutes at 420° F.

Dough mixing time will vary, depending upon flour (type and grade, i.e., winter wheat and spring). Absorption also is variable. The following characteristics were noted in the sponge stage of preparing the breads:

| Emulsifier | Surface Character | Gas Retention | Fermentation | Sponge Condition |
|---|---|---|---|---|
| A. Water-Emulsion Type, 38% solids; 62% Water [1] | Normal | Normal | Normal | Slightly tenacious. |
| B. Plasticized mono- and Di-glycerides, 43% monos | do | do | do | Do. |
| C. Plasticized Mono- and Di-glycerides, 37% monos | do | do | do | Do. |
| D. Plastic Shortening Type, 8% Total monoglyceride in Shortening [2] | do | do | do | Do. |
| E. Lard | More moist, slightly sticky | do | do | Normal. |
| F. Powdered Glyceryl, Mono- and Di-stearate of 3 I.V. and 44% monos, all finer than 150 microns. | Drier | Improved Retention. | Slightly Accelerated. | Shorter. |

[1] Solids were mono- and di-glycerides containing 40% mono-glycerides.
[2] Shortening content: 20% (wt.) balance mono- and di-glycerides comprising 40% monoglycerides (wt.).

*Dough stage*

| Emulsifier | Clean Up | Mixing Time | Absorption, Percent | Surface Character | Dough Condition |
|---|---|---|---|---|---|
| A. (Emulsion) | Normal | Normal | 64 | Slightly moist to sticky | Extensible. |
| B. (Plastic) | do | do | 64 | do | Do. |
| C. (Plastic) | do | do | 64 | do | Do. |
| D. (Shortening) | do | do | 64 | do | Do. |
| E. (Lard) | do | Slightly longer | 64 | do | Do. |
| F. (Powdered) | Quicker | Slightly shorter | 68 | Drier | Improved Extendability. |

The following comments relating to the benefits produced by use of the powdered emulsifiers assist to explain the above tabulation:

*Clean Up.*—This term represents the length of time required for dough development to start after the sponge dough has been added to the other ingredients. With the more satisfactory fermentation in the tests using powdered mono-distearate, the clean-up time was shortened.

*Mixing Time.*—The use of the powdered mono-distearate enabled the dough to be mixed more readily with a more satisfactory development of gluten.

*Absorption.*—The finely divided particles of the powdered mono-distearate resulted in an increased distribution throughout the dough. This increased distribution of emulsifier permits the increased addition of water (4%) which increases the pliability and workability of the dough.

*Surface Characteristics.*—The thin surface film, formed when the powdered mono-distearate was used, resulted in less sticking in the "Make-Up" equipment and reduced the amount of dusting flour required to prevent the dough from sticking to the rolls.

*Dough Condition.*—The use of the powdered mono-distearates resulted in a better fermentation, a more readily developed and drier dough, and increased absorption. This resulted in a more extensible finished dough.

The following tabulation and comments compare the characteristics of the breads secured from the six tests:

*Characteristics of baked products*

| Emulsifier | Pan Proofing | Oven Spring | Volume | Color of Crust | Symmetry | Break or Shred | Grain | Texture | Color of Crumb | Aroma | Taste |
|---|---|---|---|---|---|---|---|---|---|---|---|
| 1. Water Emulsion Type | Normal | Normal | Normal | Good | Good | Sl. Irregular | Closed | Soft-Good | White | Pleasing | Good. |
| 2. Plasticized Mono-Diglycerides | do | do | do | do | do | do | do | do | do | do | Do. |
| 3. Plasticized Glycerol Mono-Diglycerides | do | do | do | do | do | do | do | do | do | do | Do. |
| 4. Plasticized Shortening Type | do | do | do | do | do | do | do | do | do | do | Do. |
| 5. Lard | do | do | do | do | do | do | do | do | do | do | Do. |
| 6. Powdered Mono-Di-Stearate | do | Sl. Increase. | Sl. Greater. | Richer Brown. | More Even. | Uniform | Finer | Softer | do | Sweeter | Do. |

*Pan Proofing.*—No measurable differences were noted.

*Oven Spring.*—Powdered mono-distearate showed slight increase.

*Volume.*—The powdered mono-distearate showed a better volume because of increased oven spring and less shrinkage.

*Color of Crust.*—The tests using powdered mono-distearate gave a richer, browner crust.

*Symmetry.*—The powdered mono-distearate gave a more uniform shaped loaf.

*Texture.*—The more satisfactory fermentation and better maturing qualities of the samples containing powdered mono-distearate allowed the dough to be sheeted thinner, which resulted in a finer grain and cell structure.

*Color of Crumb.*—The color of crumb was much brighter on the powdered mono-distearate.

*Aroma.*—A more pleasing aroma was noted due to better fermentation.

*Taste.*—No differences noted.

EXAMPLE 2

When tests duplicating those of Example 1 were run using the following powdered emulsifier, results were secured which were analogous to those obtained from the powdered mono- and di-stearates of Example 1. The emulsifier was a lactyl, palmityl, stearyl partial glyceride as prepared according to Example 2 of U.S. 2,690,971 (mol ratio of glycerine:fatty acid:lactic acid=1:1:1). The material was powdered by grinding flakes of the emulsifier in a Waring Blendor with Dry Ice to a particle size finer than 150 microns.

Having described our invention, what we claim is:

1. The method of preparing yeast-leavened baked goods which comprises the step of mixing with the dry ingredients of the recipe for said goods finely-divided, free-flowing, edible emulsifier having a particle size below about 150 microns and having a chemical composition which renders said emulsifier normally solid at ambient room temperature, said finely-divided emulsifier constituting the sole added emulsifier in the raw goods at the time the liquid ingredients of the recipe are added to said dry ingredients.

2. The method of preparing yeast-leavened baked goods which comprises the steps of mixing with the dry ingredients of the recipe for said goods finely-divided, free-flowing, normally-solid, edible emulsifier as defined hereinafter, said finely-divided emulsifier having a particle size below about 150 microns, constituting the sole added emulsifier in the raw gods at the time the liquid ingredients of the recipe are added to the dry ingredients, and consisting essentially of partial esters of glycerine containing only acyloxy residues of: (A) at least one edible fatty acid having 16–24 carbon atoms and a melting point at least as high as palmitic acid; and (B) not more than 2 mols per mol of combined fatty acid of edible, lower hydroxy carboxylic acid having 2–6 carbon atoms.

3. The method of preparing yeast-leavened baked goods which comprises the step of mixing with the dry ingredients of the recipe for said goods finely-divided, free-flowing, normally-solid edible emulsifier as described hereinafter, said finely-divided emulsifier having a particle size below about 150 microns, constituting the sole added emulsifier in the raw goods at the time the liquid ingredients of the recipe are added to said dry ingredients, and consisting essentially of partial esters of glycerine containing only acyloxy residues of fatty acids having 16–24 carbon atoms and having a melting point at least as high as palmitic acid.

4. In a process of preparing yeast-leavened baked goods from a recipe calling for liquid ingredients and dry ingredients, the improvement which consists essentially of dispersing finely-divided free-flowing, edible emulsifier, said emulsifier having a particle size below about 150 microns and having a chemical composition which renders said emulsifier normally solid at ambient room temperature, through at least the flour portion of the dry ingredients of the recipe before adding liquid ingredients thereto.

(References on following page)

References Cited in the file of this patent

UNITED STATES PATENTS

| | | |
|---|---|---|
| 1,326,276 | Kohman et al. | Dec. 30, 1919 |
| 2,132,417 | Harris | Oct. 11, 1938 |
| 2,132,436 | Reynolds et al. | Oct. 11, 1938 |
| 2,313,621 | Bruson | Mar. 9, 1943 |
| 2,381,881 | Sauer | Aug. 14, 1945 |
| 2,584,998 | Filachione et al. | Feb. 12, 1952 |
| 2,633,604 | Allen et al. | Apr. 7, 1953 |
| 2,638,475 | Ross | May 12, 1953 |
| 2,657,143 | Kass | Oct. 27, 1953 |
| 2,690,971 | Iveson et al. | Oct. 5, 1954 |
| 2,819,228 | Dell | Jan. 7, 1958 |
| 2,827,378 | Glabe | Mar. 18, 1958 |

OTHER REFERENCES

The Bakers Digest, page 46, October 1955.